(12) United States Patent
Chemiakina et al.

(10) Patent No.: US 8,948,136 B2
(45) Date of Patent: Feb. 3, 2015

(54) RESOURCE ALLOCATION IN A COMMUNICATION SYSTEM

(75) Inventors: Svetlana Chemiakina, Nørresundby (DK); Preben Mogensen, Gistrup (DK); Esa Malkamäki, Espoo (FI)

(73) Assignee: Nokia Corporation, Espoo (FI)

( * ) Notice: Subject to any disclaimer, the term of this patent is extended or adjusted under 35 U.S.C. 154(b) by 1132 days.

(21) Appl. No.: 11/232,902

(22) Filed: Sep. 23, 2005

(65) Prior Publication Data

US 2006/0215612 A1 Sep. 28, 2006

(30) Foreign Application Priority Data

Sep. 24, 2004 (GB) .................................. 0421353.4

(51) Int. Cl.
*H04J 3/24* (2006.01)
*H04W 72/10* (2009.01)
*H04W 72/04* (2009.01)

(52) U.S. Cl.
CPC .......... *H04W 72/10* (2013.01); *H04W 72/0413* (2013.01)
USPC ... 370/332; 370/349; 370/395.4; 370/395.42; 370/232; 370/441

(58) Field of Classification Search
USPC ................. 370/332, 349, 441, 232, 310, 278, 370/395.4, 395.42
See application file for complete search history.

(56) References Cited

U.S. PATENT DOCUMENTS

| | | | | |
|---|---|---|---|---|
| 5,826,236 A | * | 10/1998 | Narimatsu et al. ................ | 705/8 |
| 6,987,777 B1 | * | 1/2006 | Cain et al. ...................... | 370/466 |
| 7,349,333 B2 | * | 3/2008 | Zellner .......................... | 370/229 |
| 2004/0258070 A1 | * | 12/2004 | Arima ......................... | 370/395.4 |
| 2005/0157687 A1 | * | 7/2005 | Heo et al. ....................... | 370/335 |
| 2005/0249133 A1 | * | 11/2005 | Terry et al. ..................... | 370/278 |
| 2006/0013268 A1 | * | 1/2006 | Terry ............................ | 370/537 |
| 2006/0046733 A1 | * | 3/2006 | Fauconnier et al. .......... | 455/450 |

FOREIGN PATENT DOCUMENTS

| | | |
|---|---|---|
| EP | 1414200 | 4/2004 |
| EP | 1443719 | 8/2004 |
| JP | 2002204257 A | 7/2002 |
| JP | 2003008635 A | 1/2003 |
| JP | 2003273880 A | 9/2003 |
| WO | 03/069807 A1 | 8/2003 |
| WO | 03/096600 A1 | 11/2003 |

OTHER PUBLICATIONS

3GPP-TS 25.308 V6.1.0-XP-002365919, "3$^{rd}$ Generation Partnership Project; Technical Specification Group Radio Access Network; High Speed Downlink Packet Access (HSDPA)", Mar. 2004, pp. 1-28.
3GPP-TS 25.214 V6.2.0-XP-002365918, "3$^{rd}$ Generation Partnership Project; Technical Specification Group Radio Access Network; Physical layer procedures (FDD)", Jun. 2004, pp. 1-64.
3GPP-TS 25.321 V6.2.0-XP002331314, "3$^{rd}$ Generation Partnership Project; Technical Specification Group Radio Access Network; Medium Access Control (MAC) protocol specification", Jun. 2004, pp. 1-61.
Pablo Jose Ameigeiras Gutierrez, "Packet Scheduling and Quality of Service in HSDPA", Oct. 2003, pp. 1-168.

* cited by examiner

*Primary Examiner* — Jamal Javaid
(74) *Attorney, Agent, or Firm* — Squire Patton Boggs (US) LLP

(57) ABSTRACT

A method of allocating resources in a communication system and a station for the communication system is disclosed. The communication system is such that a plurality of user equipment can communicate data on a dedicated channel. In the method a request for communication resources may be sent from a user equipment to the station on a first protocol layer. Priority information is obtained at the station from a data flow on a second protocol layer. Communication resources may then at least partially be allocated based on said priority information.

15 Claims, 4 Drawing Sheets

RESOURCE ALLOCATION IN A COMMUNICATION SYSTEM

BACKGROUND OF THE INVENTION

1. Field of the Invention

The present disclosure relates to a communication system, and in particular, but not exclusively, to allocation of resources, for example, scheduling of data packets in a communication system providing wireless communication for users thereof.

2. Description of the Related Art

A communication system can be seen as a facility that enables communication sessions between two or more entities such as user equipment and/or other nodes which are a part of or are otherwise associated with the communication system. The communication may comprise, for example, communication of voice, data, multimedia and so on. A user equipment connected to a communication system may, for example, be provided with a two-way telephone call or multi-way conference call or with a data connection. A user equipment may communicate packet data to and from a server entity, between two or more user equipments or otherwise on the interface between the user equipment and the communications system.

A communication system typically operates in accordance with a given standard or specification which sets out what the various entities associated with the system are permitted to do and how that should be achieved. For example, the standard or specification may define if a user equipment is provided with a circuit switched service or a packet switched service or both. Communication protocols and/or parameters which shall be used for the connection are also typically defined. For example, the manner how the user equipment can access the communication system and how communication shall be implemented between the user equipment and the elements of the communication network is typically based on predefined communication protocols. In other words, a specific set of "rules" on which the communication can be based on needs to be defined to enable the user equipment to communicate via the communication system.

Communication systems proving wireless communication for user equipment are known. These systems are commonly referred to as mobile systems, although in certain systems the mobility may be restricted to substantially small areas. An example of the mobile systems is the public land mobile network (PLMN). A PLMN is commonly based on cellular architecture. Another example is a mobile system that is based, at least partially, on use of communication satellites. Mobile communications may also be provided by means of other mobile systems, such as by means of wireless local area networks (WLAN). The mobile users are commonly enabled to roam into networks other than the networks they subscribe to, and therefore common standards and protocols are essential for wireless communication systems offering mobility.

In a common wireless system a base station servers a plurality of user equipment. A user equipment may also be in wireless communication with two or more base stations at the same time. Communication on the wireless interface between the user equipment and the base station can be based on an appropriate communication protocol. The skilled; person knows the basic operational principles and elements required for the wireless access to the network. Examples of these include access systems such as the CDMA (Code Division Multiple Access), WCDMA (Wide-band CDMA), TDMA (Time Division Multiple Access), FDMA (Frequency Division Multiple Access), or SDMA (Space Division Multiple Access) and hybrids thereof.

Each base station is controlled by an appropriate control arrangement. The operation of a base station and other apparatus for the communication can be controlled by one or several control entities. Two or more base stations may be controlled by a controller. For example, the third generation (3G) Wideband Code Division Multiple Access (WCDMA) networks employ control entities known as radio network controllers (RNC) for controlling the operation of the wireless access network. A WCDMA radio network controller typically controls a number of stations, and often all stations, of an access network.

The access network controllers are connected to core network entities. One or more gateway nodes may also be provided for connecting a communication network to other networks. For example, a mobile network may be connected to communication networks such as an IP (Internet Protocol) and/or other packet data networks.

As mentioned above, a user equipment may communicate data over a wireless interface with the access system. When a user equipment has sufficient amount of data to transmit in a buffer thereof some capacity needs to be allocated to the user equipment by the access system, and more particularly, air interface capacity is required from the base station.

A base station may receive substantially simultaneously a number of capacity allocation requests from different user equipment. Due to the limitations in the resources available over the air interface the base station may need to be able to allocate the capacity to those user equipments which should, for reason or another, transmit data with higher priority. In other words, the base stations may need to be able to prioritize transmission by the user equipment before allocating capacity for data transmissions.

Conventionally the prioritization has been provided by mapping different services onto dedicated channels with different priority amongst the channels. The packet scheduling functionality in the network side is located at the radio access network controller level, such as the RNC of the WCDMA. This has been a fairly straightforward solution since for example in the WCDMA the radio network controller (RNC) is aware about the priorities of the different radio bearers on the so called the Medium Access Control d (MAC-d) layer.

In certain applications it is possible to multiplex data carried on different radio bearers with different priorities into one transport channel. For example, wireless communication between a user equipment and a base station can be signaled on an Enhanced Dedicated Channel (E-DCH) at the mobile terminal Medium Access Control e (MAC-e) layer. This layer is hierarchically a lower level layer than the above mentioned MAC-d, and is only used by the user equipment and the base station.

The above mentioned method of mapping different services onto dedicated channels with different priorities is not considered optimal in the case of technologies such as the E-DCH where fast packet scheduling is done at the base station (called Node B in the WCDMA) and the available E-DCH resources must be shared with other users in a shared channel fashion.

In High Speed Downlink Packet Access (HSDPA) this problem is solved by using Scheduling Priority Indicator (SPI) associated with different bearers from the RNC to the Node B. However this solution cannot always be applied to E-DCH, for example because the quality indicators cannot be signaled explicitly at the layer 1 of the protocol stack due to limited resources available to the signaling.

Therefore there is a need for an improved solution for scheduling of data transmission on the wireless interface in the access network base station level.

SUMMARY OF THE INVENTION

Embodiments of the present invention aim to address one or several of the above problems.

According to one embodiment, there is provided a method of allocating resources in a communication system wherein a plurality of user equipment can communicate data on a dedicated channel. In the a request for communication resources is sent on a first protocol layer from a user equipment to a station of the communication system. If required, priority information is obtained at the station from a data flow on a second protocol layer, where after the communication resources are allocated based on said priority information.

According to another embodiment, there is provided a station for a communication system. The station comprises a radio part for communication with user equipments, and a controller configured to receive requests for communication resources on a first protocol layer from the user equipments. The controller is also configured to obtain at the station priority information from a data flow on a second protocol layer, and to allocate the communication resources based on said priority information.

According to yet another embodiment, there is provided a communication system comprising the above referenced station.

The embodiments of the invention may provide advantage in preventing signaling overflows, especially on the wireless interface. Furthermore, some embodiments may enable optimization and/or more efficient utilization of resources of the wireless interface and/or interfaces within an access network. Some of the embodiments may also enable better quality of service (QoS) to the end users, serving high priority services and/or users first. For example, streaming may be served before best effort traffic, and so on. Moreover, the invention may be implemented without any modification to the existing user equipments.

BRIEF DESCRIPTION OF DRAWINGS

For better understanding of the present invention, reference will now be made by way of example to the accompanying drawings in which.

DETAILED DESCRIPTION OF THE PREFERRED EMBODIMENTS

It is noted that even though the exemplifying communication system shown and described in detail in this disclosure uses the terminology of the $3^{rd}$ generation (3G) WCDMA (Wideband Code Division Multiple Access) networks, such as the UMTS (Universal Mobile Telecommunications System) or CDMA2000 public land mobile networks (PLMN), embodiments of the proposed solution can be used in any wireless communication system wherein similar problems may be solved by means of the embodiments of the invention.

Figure 1:
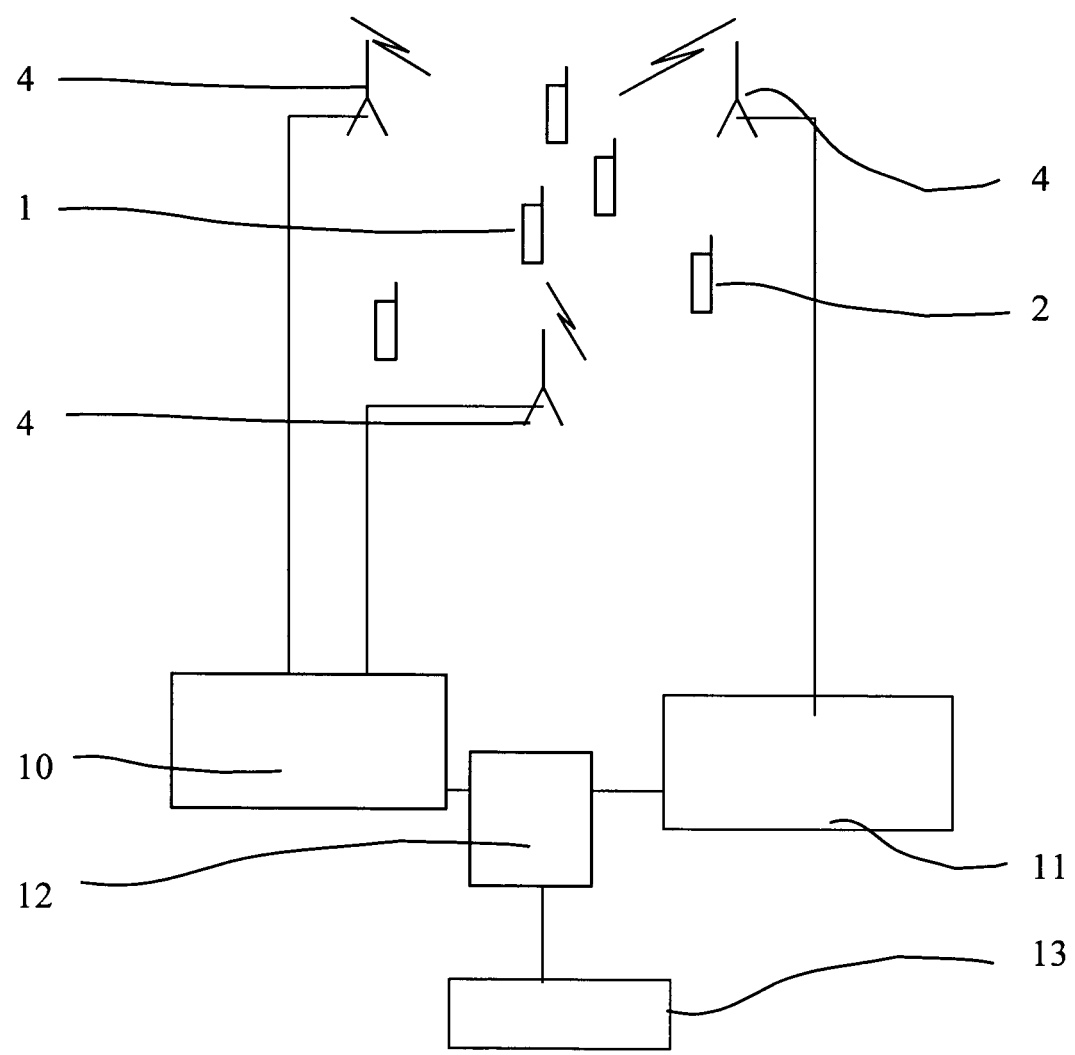
FIG. 1 shows a communication system wherein the present invention may be embodied.

FIG. 1 shows a number of base stations 4. It shall be appreciated that the base stations are sometimes, such as in the WCDMA access networks, referred to by the term Node-B. Each base station 4 is provided with an appropriate radio part so that it can wirelessly transmit signals to and receive signals from a plurality of mobile user equipment 1,2. A mobile user equipment is sometimes referred to as a mobile station (MS) or mobile terminal (MT). Likewise, each of the mobile user equipment 1, 2 is able to transmit wireless signals to and receive signals on the air interface from appropriate base station 4.

An appropriate user equipment is provided with required radio transmission elements and controller functions so that it is enabled to send and receive data from the network, and process control instructions it may receive from the network. Typically a mobile user equipment is able to move within the access network provided by one or more base stations and also from one access network coverage area to another coverage area. The location of a mobile station may thus vary in time as the mobile user equipment may be free to move within the service area of the mobile system.

Each of the base stations is connected to an access network controller. FIG. 1 shows two access network controllers, and more particularly radio network controllers (RNC) 10 and 11. The access network controllers are commonly connected to other network elements, such as to an appropriate switching center 12, a gateway node 13 and so on via suitable interconnections.

Figure 2:
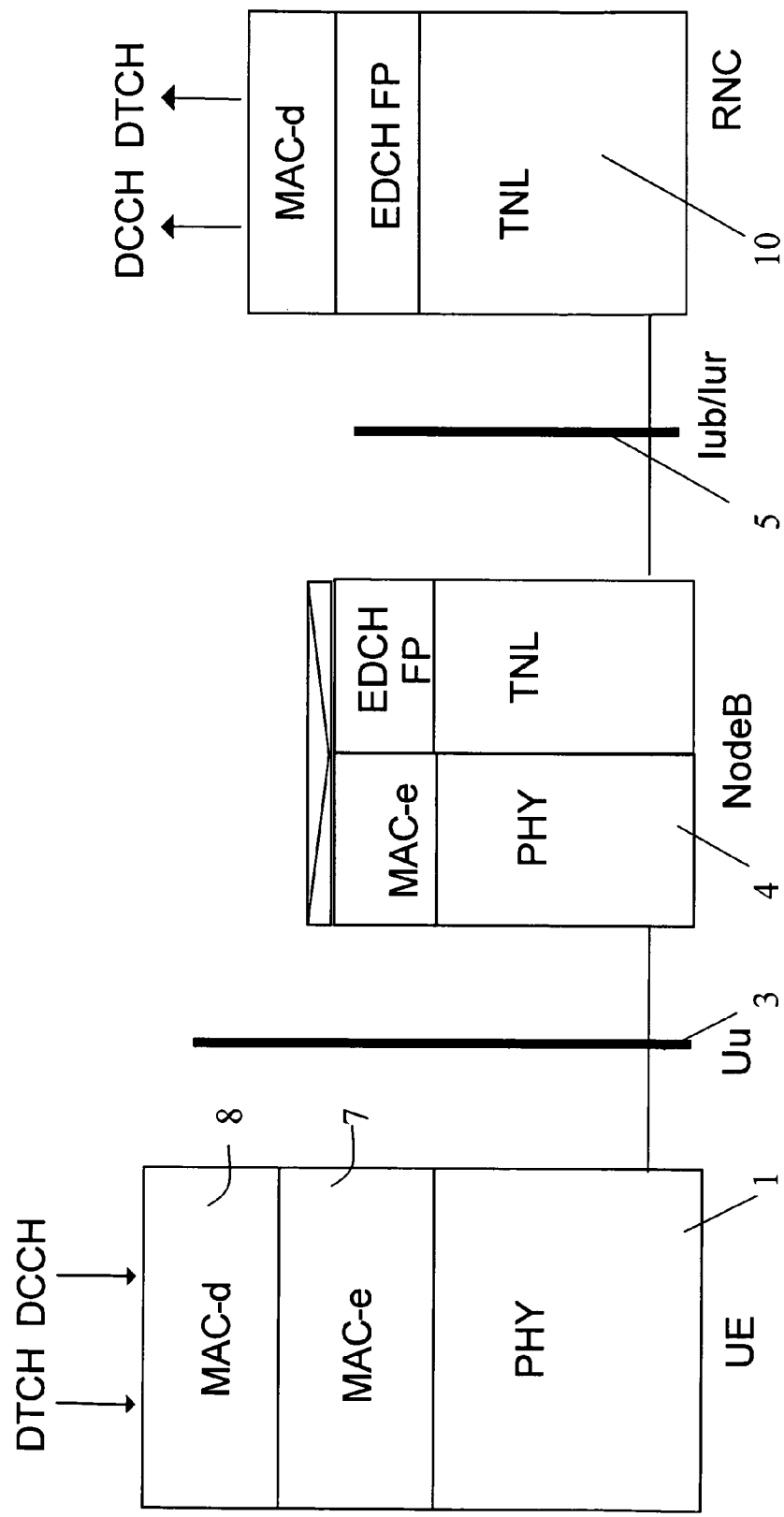
FIG. 2 a detailed example of a possible interface protocol architecture between a mobile user equipment and an access network controller.

FIG. 2 shows a detailed example of a possible interface protocol architecture between a mobile user equipment 1, a base station 4 and an access network controller 10. More particularly, FIG. 2 shows protocol architecture for an Enhanced Dedicated Channel (E-DCH) transport channel. At the mobile user equipment 1 different priorities of the radio bearers are known at the MAC-d level 8. In case insufficient transmitting resources are available, the mobile user equipment may schedule data with higher priority to be transmitted first.

As shown in FIG. 2, MAC-d protocol is located in the radio network controller 10, but not in the base station 4. MAC-d provides medium access control functionalities in association with the dedicated channels, for example function relating to multiplexing, mapping on the transport channels, Cyclic Redundancy Code (CRC), Frame Error Rate (FER).

MAC-e protocol, in turn, is located at the base station 4, for example Node B. MAC-e functions, for example to demultiplex different MAC-d flows to the same E-DCH channel. Other functions performed by MAC-e include tasks such as handling of Hybrid Automatic-Repeat-Request (HARQ) retransmissions and scheduling.

In the herein described embodiments the base station 4 may not always be aware of the priority of the data until a user equipment starts to transmit and the MAC-d flows are demultiplexed. However, in the embodiment resources may be allocated for a short period of time, the flow may be de-multiplexed and its priority checked at the MAC-d flow. Thus, when a Node-B 4 of FIG. 2 receives the capacity request from the user equipment 1, it may allocate resources for this request for short time interval, during which the Node-B demultiplexes the MAC-e flow from the user equipment. The Node-B 4 also checks the priority of the data transmitted by the mobile user equipment from the MAC-d flow. In other words, if the user equipment does not give the priority in the MAC-e flow, for example in a scheduling priority indicator (SPI), the priority may then be detected from another protocol layer, such as from the queue identity (QID) of the MAC-d flow.

Afterwards, the Node-B 4 may use the priority information received on the MAC-e level for appropriate resource scheduling. For example, the Node-B may use the priority information for packet scheduling over the Uu or Iub interfaces 3 and 5, respectively.

Figure 3:
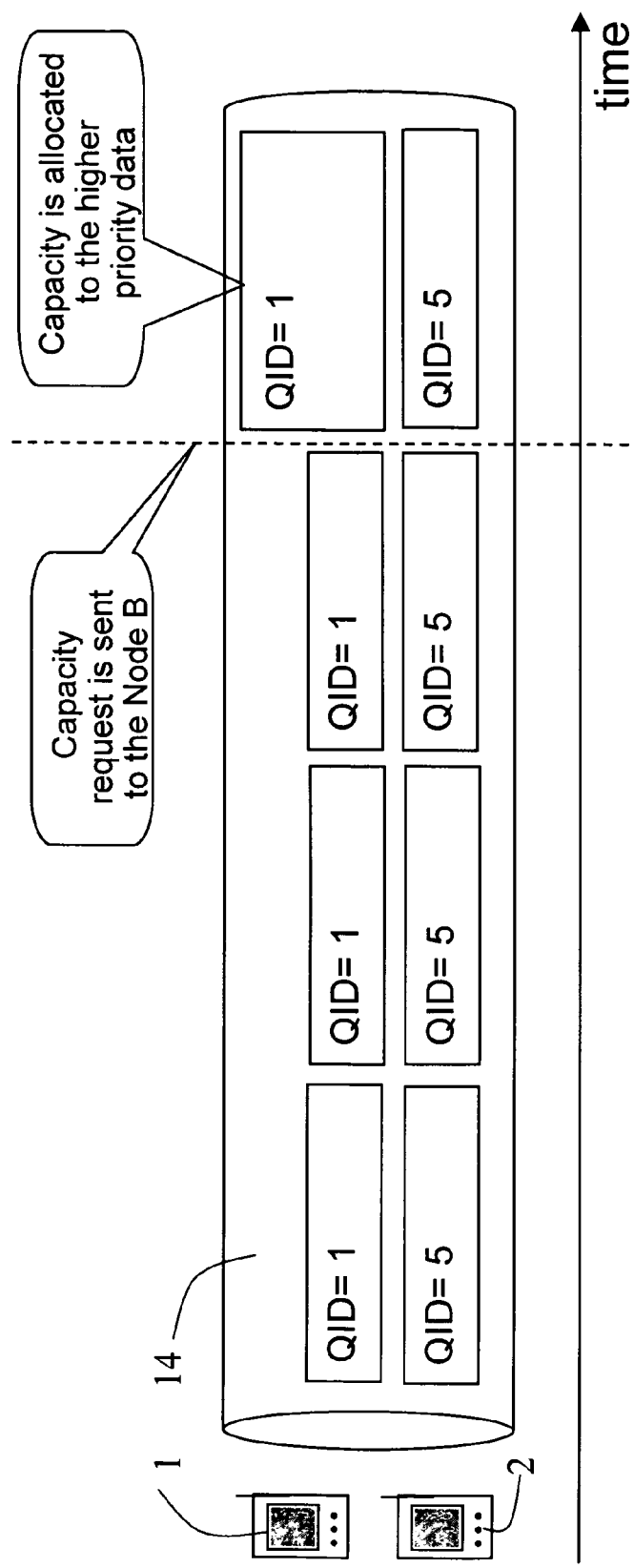
FIG. 3 illustrates the principles of an embodiment.
Figure 4:
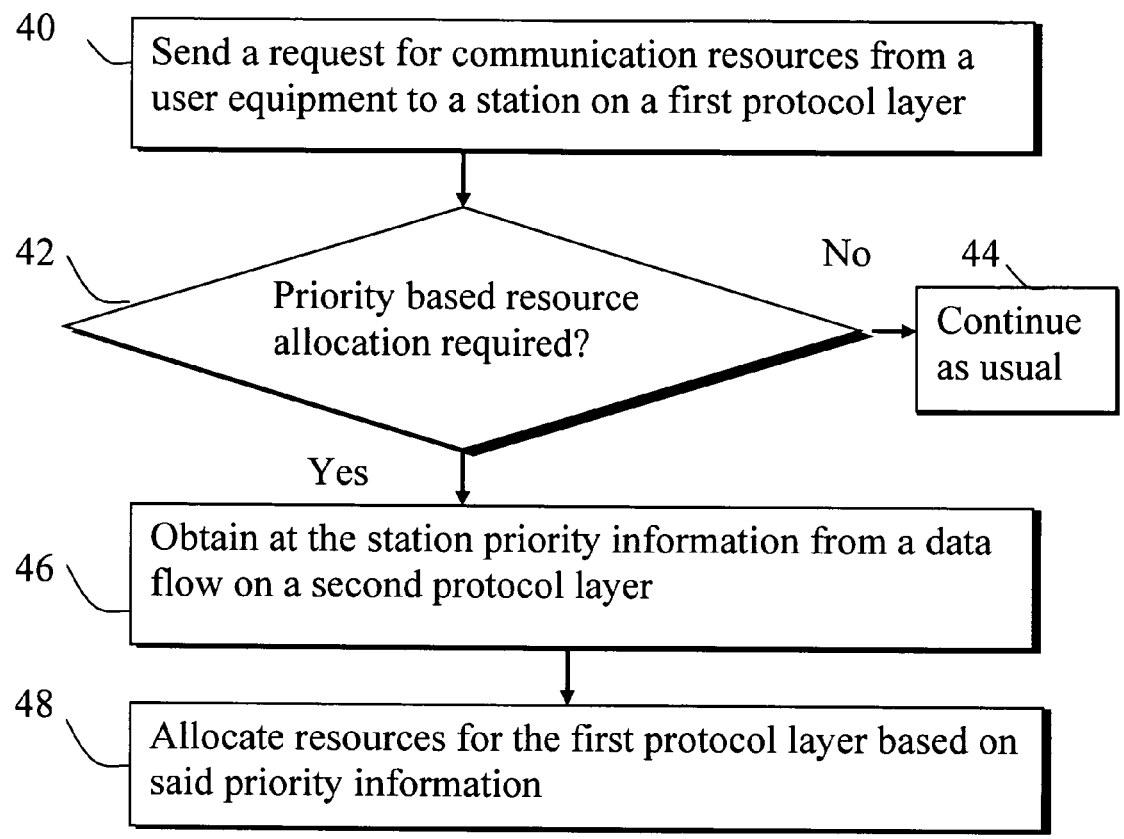
FIG. 4 is a flowchart illustrating an embodiment of the present invention.

FIG. 3 clarifies an embodiment that is applied to a WCDMA network implementing E-DCH in the uplink. In particular, in the embodiment a Node B of a WCDMA radio access network is configured to assign the radio resources to the different mobile user equipment upon request. FIG. 4 shows in more general term the operation of the embodiment.

Mobile user equipments 1 and 2 transmit data with different priorities. The available resources over the air interface are limited by the bandwidth illustrated in FIG. 3 by the "tube" 14. The Node B is aware about the priorities as it performs demultiplexing of the MAC-e E-DCH flows. When both mobile user equipments 1 and 2 make a substantially simultaneous capacity upgrade request at step 40, resource allocation is required, and the Node-B 4 grants the request of mobile user equipment that transmit the data with higher priority. In FIG. 3 that would be the mobile user equipment 1. The required decision making procedure and other required control operations can be provided by any appropriate processor or a number of processors provided in the Node-B.

In the embodiment the Quality ID (QID) of the (Medium Access Control d) MAC-D flows are used for priority based packet scheduling in MAC-e in step 46. This may occur for example in response to detection at step 42 that no explicit Scheduling Priority Indication (SPI) is signaled from the user equipment 1 to the Node-B 4 over the Uu interface 3.

If the rate request layer 1 message sent from the user equipment to the Node B over the Uu interface contains a SPI, the operation continues from 42 to 44 and normal processing of the data flow follows.

If it is detected that no SPI was received, the Information obtained at step 46 may then be used at step 48 for example for optimal resource scheduling over the Uu and Iub interfaces.

The above data processing functions may be provided by means of one or more data processor entities. Appropriately adapted computer program code product may be used for implementing the embodiments, when loaded to a computer, for example for performing the computations and the searching, matching and combining operations. The program code product for providing the operation may be stored on and provided by means of a carrier medium such as a carrier disc, card or tape. A possibility is to download the program code product via a data network. Implementation may be provided with appropriate software in a location server. Thus it may be that no additional hardware is needed in some applications. Additional memory and processing capacity may be needed in a location server.

It should be appreciated that whilst embodiments of the present invention have been described in relation to user equipment such as mobile stations, embodiments of the present invention are applicable to any other suitable type of user equipment. Also, while the above describes mainly allocation of resources on the first layer, communication resources of any other layer or of other type can also be allocated by means of the invention.

It is understood that other embodiments of the invention are possible, while remaining within the scope of the invention. Thus the invention is also applicable to other mobile techniques than the WCDMA.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   receiving at an apparatus, on a first protocol layer, a request for communication resources from a user equipment of a plurality of user equipment;
   receiving, at the apparatus, priority information from a data flow between the user equipment and the apparatus on a Medium Access Control e (MAC-e) level different from the first protocol layer; and
   allocating the communication resources based on said priority information received on the MAC-e level,
   wherein the receiving the priority information comprises monitoring MAC-e flows for the priority information located in at least one of the MAC-e flows.

2. The method as claimed in claim 1, wherein the receiving the request for the communication resources comprises receiving the request on an e-layer of a Medium Access Control protocol.

3. The method as claimed in claim 1, wherein the receiving the request for the communication resources comprises receiving the request on layer 1 of a protocol stack.

4. The method as claimed in claim 1, further comprising:
   performing the communication of the data from the plurality of user equipment on an Enhanced Dedicated Channel of a Wideband Code Division Multiple Access network.

5. The method as claimed in claim 1, wherein the allocating the communication resources comprises allocating wireless resources between the user equipment and the apparatus.

6. The method as claimed in claim 1, wherein the allocating resources comprises allocating the communication resources on an interface between the apparatus and another entity of the communication system.

7. The method as claimed in claim 1, further comprising:
   allocating the communication resources for a short period of time;
   de-multiplexing the data flow on the second protocol layer; and
   receiving the priority information from the data flow on the second protocol layer.

8. A computer program embodied on a non-transitory computer-readable storage medium, the computer program being configured to control a processor to perform a method, the method comprising: receiving at an apparatus, on a first protocol layer, a request for communication resources from a user equipment;
   receiving at the apparatus priority information from a data flow between the user equipment and the apparatus on a Medium Access Control e (MAC-e) level different from the first protocol layer; and
   allocating the communication resources based on said priority information received on the MAC-e level,
   wherein the receiving the priority information comprises monitoring Medium Access Control e (MAC-e) flows for the priority information located in at least one of the MAC-e flows.

9. An apparatus, comprising:
   a processor; and
   a memory including computer program code, the memory and the computer program code configured to, with the processor, cause the apparatus at least to:
   receive a request for communication resources from a user equipment on a first protocol layer, receive priority information from a data flow between the user equipment and the apparatus on a Medium Access Control e (MAC-e) level different from the first protocol layer; and allocate the communication resources based on said priority information received on the MAC-e level, wherein the memory and the computer program code are further configured to, with the processor, cause the apparatus at least to receive the priority information by monitoring Medium Access Control e (MAC-e) flows for the priority information located in at least one of the MAC-e flows.

10. The apparatus as claimed in claim 9, wherein the request for the communication resources comprises a request transmitted on an e-layer of a Medium Access Control protocol.

11. The apparatus as claimed in claim 9, wherein the request for the communication resources comprises a request transmitted on layer 1 of a protocol stack.

12. The apparatus as claimed in claim 9, wherein the memory and the computer program code are further configured, with the processor, to cause the apparatus at least to: perform the communication of the data from the user equipment on an Enhanced Dedicated Channel of a Wideband Code Division Multiple Access network.

13. The apparatus as claimed in claim 9, wherein the allocating the communication resources comprises allocating wireless resources between the user equipment and the apparatus.

14. The apparatus as claimed in claim 9, wherein the allocating the communication resources comprises allocating the communication resources on an interface between the apparatus and another entity of the communication system.

15. The apparatus as claimed in claim 9, wherein the memory and the computer program code are further configured, with the processor, to cause the apparatus at least to:

allocate the communication resources for a short period of time;

de-multiplex the data flow on the second protocol layer; and receive the priority information from the data flow on the second protocol layer.

* * * * *